United States Patent [19]
Oberdiear

[11] 3,944,317
[45] Mar. 16, 1976

[54] ADAPTER FOR SHIELDED ELECTRICAL CABLE CONNECTIONS

[75] Inventor: Robert C. Oberdiear, Los Angeles, Calif.

[73] Assignee: Amex Systems, Inc., Lawndale, Calif.

[22] Filed: Jan. 13, 1975

[21] Appl. No.: 540,591

[52] U.S. Cl................................ 339/143 R; 174/87
[51] Int. Cl.² ........................................ H02G 15/08
[58] Field of Search............ 174/87, 88 R, 89, 75 C, 174/75 D, 65 R, 76; 339/89 R, 89 M, 89 C, 90 R, 176 R, 91 R, 143; 285/12, 179, 388, 169

[56] References Cited
UNITED STATES PATENTS

| | | | |
|---|---|---|---|
| 2,286,952 | 6/1942 | Cannon et al.............. | 339/89 M X |
| 2,829,358 | 4/1958 | Testori........................ | 339/89 M X |
| 3,659,251 | 4/1972 | Fish ............................ | 174/87 |
| 3,784,233 | 1/1974 | Hilbert........................ | 174/87 X |

Primary Examiner—Darrell L. Clay
Attorney, Agent, or Firm—Robert C. Comstock

[57] ABSTRACT

An adapter for converting a non-repairable electrical cable connection into one which is repairable. The cable connection is the type in which a wire bundle is enclosed within a braided shield which is permanently terminated to a backshell, the backshell being threadedly secured by a coupling nut to a connector to which the wire bundle is terminated. The adapter comprises a pair of semi-circular adapter sections which combine to form a cylindrical adapter which fits around an unshielded portion of the wire bundle between the backshell and connector. The adapter has external threading at one end for connection to the backshell. A second coupling nut slidably mounted around the adapter connects the opposite end of the adapter to the connector. The second coupling nut is removable from around the adapter to permit the adapter sections to be separated and removed from around the unshielded portion of the wire bundle. This permits repair of the bundle and its terminations to the connector without distrubing the shielding or shielding termination.

1 Claim, 5 Drawing Figures

3,944,317

ADAPTER FOR SHIELDED ELECTRICAL CABLE CONNECTIONS

BACKGROUND OF THE INVENTION

1. Field of the Invention

The invention relates to an adapter for converting a nonrepairable shielded electrical cable connector to a repairable one.

2. Description of the Prior Art

In wire cable harnesses, particularly air frame harnesses, metal braid shielding is used to prevent signals on the inside of the cable from being interfered with by signals on the outside of the cable bundle. It is becoming more difficult to accomplish effective shielding required by the delicacy of current day instrumentation. In addition to the normal types of interference, it is sometimes required that critical lines be shielded from electro-magnetic pulses. These pulses have been known to reach in excess of several thousand volts. To shield from these effects, an extremely low resistive path is required between the aircraft ground and the shield of the cable run.

The shielding prevents outside electrical signals or impulses of any kind from penetrating the cable by induction and providing undesirable cross-signals or interference. If the shielding is distrubed in any way, such as by forcing it back along the cable in order to effect repairs, the electrical shielding is adversely affected and is for all practical purposes destroyed.

The primary requirement for a repairable connector accordingly is that all repairs must be effected and retermination of the wires established without in any way disturbing the braided shield.

At the present time, there are two types of shielded electrical cable connectors in use. One is the non-repairable type such as that using crimped ring or Magnaform (trademark) termination of the braided shield. Such connectors cannot be repaired because there is no way to effect such a repair without disturbing the braided shield, which disturbance results in impairment of the electrical shielding.

Another requirement of a repairable connector is that the connector should be repairable in the field. In the case of Magnaform shield terminations of the type now in use, this cannot be done because Magnaform equipment is not available or adaptable for use in the field.

For these reasons, crimped ring, Magnaform and permanent type non-repairable connectors cannot be used in applications where repairability is either a requirement or a possibility. The only other available alternatives at the present time are the much more expensive, complex and heavier repairable assemblies such as those disclosed in U.S. Pat. Nos. 3,830,937 and 3,739,076. The added expense of such units is undesirable in all applications and the added weight is undesirable in aircraft applications. The effectiveness of the shield termination and shielding effect also may be less than that of a nonrepairable construction.

SUMMARY OF THE INVENTION

It is the primary object of the invention to provide an adapter whereby a non-repairable connector of the crimp braid or Magnaform type can be converted to a repairable one, capable of even being repaired in the field. An important feature of the invention is that it permits repair without in any way altering either the braided shield or its permanent termination.

The connector of the present invention accordingly provides the advantages and benefits of both types of connectors now in use. It permits use of the more desirable and more efficient Magnaform or crimp braid shield termination while at the same time providing for disassembly and repair of the connector leads or cable connections without affecting the shield termination or shielding effectiveness in any way.

The invention provides the same type of easy disassembly and repairability as the repairable assemblies such as those of U.S. Pat. Nos. 3,830,937 and 3,739,076, but eliminates their undesirable qualities of complexity, increased weight and reduced effectiveness.

Another object of the invention is to provide an adapter which is capable of use for direct connection, right angle connection, 45° connection or any other angle which may be required or desired.

It is among the objects of the invention to provide an adapter whereby termination of a shielded cable to a connector is simpler and easier to repair, lighter in weight, less expensive and more adaptable than terminating devices and methods of the type now in use.

A further object of the invention is to provide an adapter having all of the advantages and benefits set forth above and described hereinafter in this specification.

The invention also comprises such other objects, advantages and capabilities as will later more fully appear and which are inherently possessed by the invention.

While there are shown in the accompanying drawings preferred embodiments of the invention, it should be understood that the same are susceptible of modification and change without departing from the spirit of the invention.

DESCRIPTION OF THE PREFERRED EMBODIMENT

Figure 1:
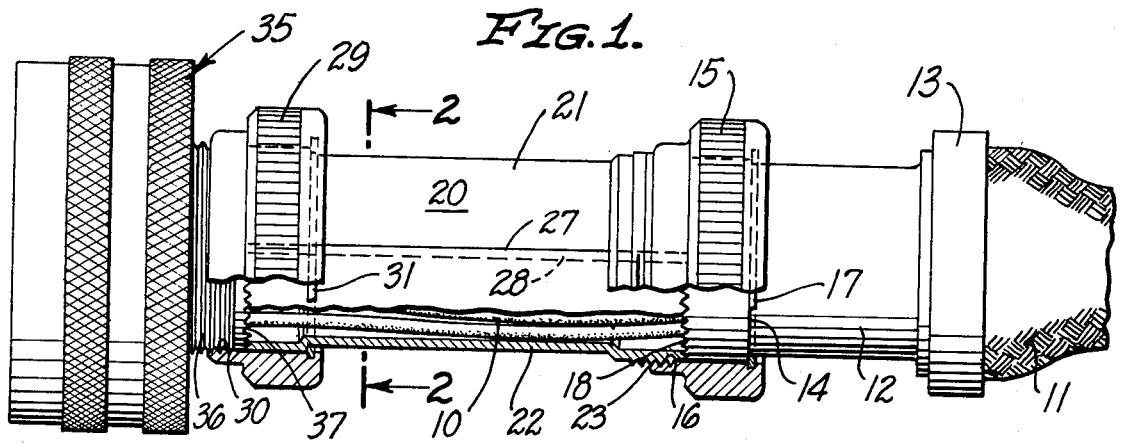
FIG. 1 is a side elevational view showing the adapter of the present invention in use with a shielded cable and connector, with portions broken away and shown in section.
Figure 2:
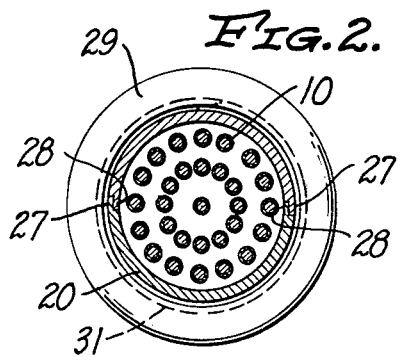
FIG. 2 is a transverse sectional view of the same, taken on line 2—2 of FIG. 1.
Figure 3:
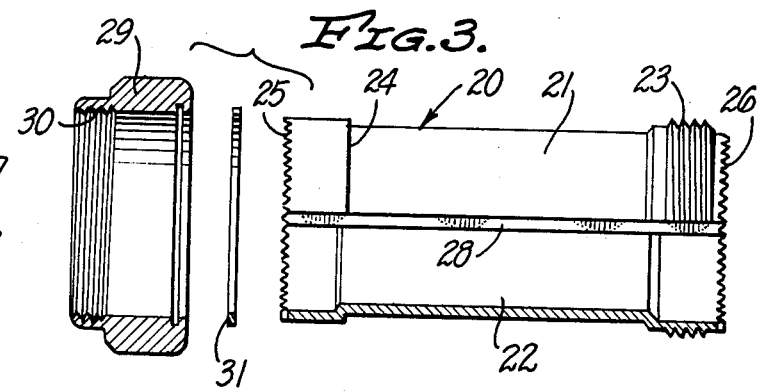
FIG. 3 is an exploded longitudinal view of the second locking nut, second retainer ring and the adapter, with the upper portion shown in elevation and the lower portion shown in section.

A preferred embodiment which has been selected to illustrate the invention is adapted for use with a conventional electrical cable of the type in which a wire bundle 10 is enclosed within a braided shield 11.

The shield 11 is terminated to the exterior of an electrically conductive tubular backshell 12 by crimping the end of the shield 11 between the interior of a ring 13 and the exterior of one end of the backshell 12. In the embodiment shown, the ring 13 is diametrically reduced by a conventional method and apparatus identified by the trademark Magnaform. A suitable alternative is a crimped ring, in which the ring is diametrically reduced by mechanical means also well-known in the art.

The opposite end of the backshell 12 carries an annular enlargement forming a shoulder 14, which is spaced slightly inwardly from the end of the backshell 12 remote from the ring 13. A coupling nut 15 is disposed in overlying relationship to the shoulder 14. The coupling nut has internal screw threading within what may be termed its outer end and an internally mounted split retainer ring 17 within its opposite or inner end. The retainer ring 17 is dimensioned to abut against, but not pass over, the shoulder 14, so that the retainer ring 17 prevents removal of the coupling nut 15 from the backshell 12. The end of the backshell 12 remote from the ring 13 is provided with a plurality of serrations 18 which extend around its entire periphery.

An elongated electrically conductive tubular adapter 20 is formed of two complementary semi-circular sections 21 and 22. One end of the adapter 20 carries diametrically enlarged external screw threading 23 which is complementary to and adapted to engage the screw threading 16 of the coupling nut 15. The other end of the adapter 20 is diametrically enlarged to form a shoulder 24 corresponding to the shoulder 14 on the backshell 12. Both ends of the adapter 20 carry serrations 25 and 26 respectively which correspond to and are complementary with the serrations 18 on the backshell 12.

The elongated edges of the adapter sections 21 and 22 are provided with outer projections 27 which overlap and are complementary with inner projections 28 to form lap or scarf points along both of the adapter sections. This is important because it provides continuous and equal shielding around the entire circumference of the adapter, the thickness along the joints being thereby made equal to the thickness of the other wall sections of the adapter. There is accordingly no undesirable gap or variation in the thickness or effectiveness of the shielding along the joints where the adapter sections meet.

A second coupling nut 29 corresponding to the coupling nut 15 is provided with internal screw threading 30 and an internally mounted but removable second split retainer ring 31. When the second retainer ring 31 is in place within the second coupling nut 21, the ring 31 prevents removal of the coupling nut 29 from the adapter 20, since the internal diameter of the ring 31 is less than the outer diameter of the shoulder 24 and external screw threading 23 at the opposite ends of the adapter 20. When the coupling nut 29 is in position surrounding the adapter 20, it accordingly prevents substantial separation or removal of the adapter sections 21 and 22.

The wire bundle 10 extends through the adapter 20 and is terminated in a conventional manner to a connector 35. The connector 35 is provided with external screw threading 36 which is formed complementarily with and is adapted to engage the internal screw threading 30 of the second coupling nut 29. The portion of the connector 35 which carries the threading 36 is also provided with serrations 37 on the end thereof which are complementary to the serrations 25 and 26 of the adapter 20.

In use, the serrations 18 of the backshell 12 fit into and engage the serrations 26 on the externally screw threaded end of the adapter 20. The internal screw threading 16 of the coupling nut 15 engages the external screw threading 23 of the adapter 20. The retainer ring 13 engages the shoulder 14 of the backshell 12. Rotation of the coupling nut 15 as far as possible results in drawing the serrations 18 and 26 into tight engagement with each other, so that one end of the adapter 20 is both mechanically and electrically connected to the backshell 12.

The second coupling nut 29 has its internal screw threading 30 engaging the external screw threading 36 on the connector 35, while its second retainer ring 31 engages the second shoulder 24. Rotation of the second coupling nut 29 as far as possible results in drawing the serrations 25 and 37 into tight engagement with each other, so that the other end of the adapter 20 is both mechanically and electrically connected to the connector 35. The projections 27 and 28 overlap to provide complete mechanical and electrical engagement between the sections 21 and 22 of the adapter 20.

When it is necessary to repair or change the connections of any of the wires of the bundle 10 to the connector 35, both coupling nuts 15 and 29 are first disconnected from the adapter 20 and connector 35 respectively. The second retainer ring 31 is then removed from the second coupling nut 29, preferably with the assistance of a suitable manually operated tool.

The second coupling nut 29 can then be slidably moved over either end of the adapter 20 and the adapter sections 21 and 22 removed from around the bundle 10. The necessary repairs or changes can then be made without in any way disrupting the shield 11 or its termination to the ring 13.

When the repairs or changes have been completed, the adapter sections 21 and 22 are moved back into place around the bundle 10 between the connector 35 and backshell 12. The second coupling nut 29 is then moved back into position surrounding the adapter 20 and the second retainer ring 31 is replaced within the second coupling nut 29. The coupling nuts 15 and 29 are then tightened and the reassembly is completed without disturbing either the braiding of the shield 11 or the Magnaform or crimped terminating ring 13.

Figure 4:
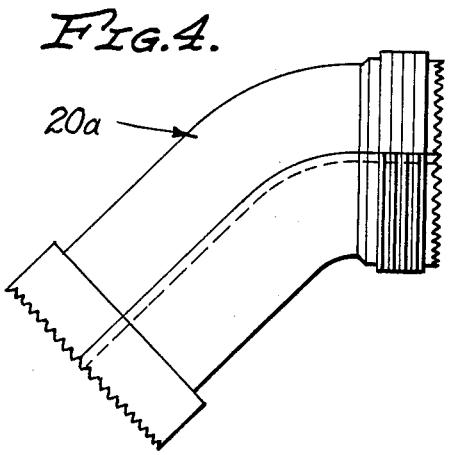
FIG. 4 is a side elevational view of another embodiment of the adapter for use in a 45° cable connection.
Figure 5:
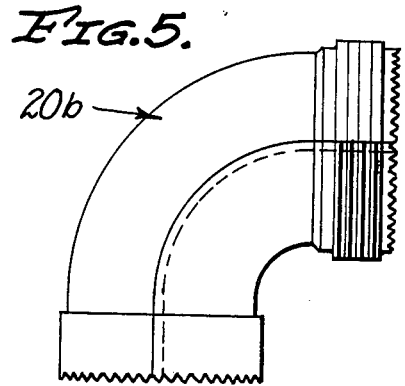
FIG. 5 is a side elevational view of still another embodiment of the adapter for use in a 90° cable connection.

FIG. 4 of the drawings shows an alternative adapter 20a which is directed at a 45° angle for connections which require such an angle. FIG. 5 shows another alternative adapter 20b which is directed at a 90° angle. The adapters may also be formed in other desired angles or configurations as well.

It will be noted that the invention achieves its objective of making a permanently terminated shield construction easily repairable, even in the field, without affecting the shielding or shield termination. The invention accordingly eliminates the necessity of disassembling and then reassembling the shield termination, as has formerly been required in previous repairable assemblies.

If the adapters 20, 20a and 20b are to be used interchangeably, it is necessary that the longitudinal dimension of the adapters be identical. In other applications, this dimension makes no difference and it may be made as short or as long as may be required or desired for the particular application and environment in which it is used.

I claim:

1. An adapter converting a non-repairable electrical cable connection into one which is repairable, said cable connection being of the type in which a wire bundle is enclosed within a braided shield which is permanently terminated to a backshell, the backshell being secured to a connector to which the wire bundle is terminated by a coupling nut which is slidably mounted on the backshell, the coupling nut having internal screw threading engaging external screw threading on the connector, the backshell having an outwardly directed annular shoulder, means carried by said coupling nut engaging said shoulder upon longitudinal movement of said coupling nut away from said backshell, said adapter comprising a pair of electrically conductive semicircular sections, said sections forming a cylindrical adapter fitting around and enclosing an unshielded portion of said wire bundle between said backshell and said connector, said adapter having diametrically enlarged external threading at one end thereof engaging said coupling nut connecting one end of said adapter to said backshell, a second coupling nut slidably mounted around said adapter, said second coupling nut having internal threading engaging the external threading on said connector connecting the other end of said adapter to said connector, the end of said adapter adjacent to said connector having an outwardly directed annular shoulder of identical dimension with said first named shoulder, a split ring mounted within said second coupling nut engaging said last named shoulder, said split ring being removable from said second coupling nut to permit said second coupling nut to be moved longitudinally past said diametrically enlarged external threading on said adapter and past said first named shoulder on said connector so that said sections can be separated and removed from around the unshielded portion of said wire bundle to permit repair of said bundle and its adjacent terminations to said connector without disturbing said shielding or the termination of said shielding to said backshell.

* * * * *